United States Patent
Baumeister et al.

(10) Patent No.: US 9,907,317 B2
(45) Date of Patent: Mar. 6, 2018

(54) LOLLIPOP MOLDING MACHINE WITH A DIE SET

(71) Applicant: GEA FOOD SOLUTIONS WEERT B.V., RV Weert (NL)

(72) Inventors: Bruno Gerfried Baumeister, Aachen (DE); Davy Segers, VP Nederweert (NL)

(73) Assignee: GEA FOOD SOLUTIONS WEERT B.V., RV Weert (NL)

( * ) Notice: Subject to any disclaimer, the term of this patent is extended or adjusted under 35 U.S.C. 154(b) by 201 days.

(21) Appl. No.: 14/909,550

(22) PCT Filed: Jul. 17, 2014

(86) PCT No.: PCT/EP2014/065451
§ 371 (c)(1),
(2) Date: Feb. 2, 2016

(87) PCT Pub. No.: WO2015/018623
PCT Pub. Date: Feb. 12, 2015

(65) Prior Publication Data
US 2016/0174592 A1    Jun. 23, 2016

(30) Foreign Application Priority Data

Aug. 6, 2013  (EP) .................. 13179459

(51) Int. Cl.
*A23G 3/12* (2006.01)
*A23G 3/02* (2006.01)

(52) U.S. Cl.
CPC .......... *A23G 3/0268* (2013.01); *A23G 3/125* (2013.01)

(58) Field of Classification Search
CPC .... A23G 3/0268; A23G 3/125; A23G 7/0031; B29C 33/30; B29C 33/303; B29C 33/306
USPC ....................................... 425/126.2
See application file for complete search history.

(56) References Cited

U.S. PATENT DOCUMENTS

| | | | |
|---|---|---|---|
| 1,369,772 A | 3/1921 | Becker et al. | |
| 1,487,788 A | 3/1925 | Lombardo et al. | |
| 1,635,682 A | 7/1927 | Marr | |
| 1,635,713 A | 7/1927 | Hislop | |
| 1,809,358 A | 6/1931 | Savage | |
| 1,864,668 A | 6/1932 | Propper | |
| 4,130,936 A | 12/1978 | Cottrell | |
| 4,208,437 A * | 6/1980 | Derckx | A23G 3/0289 426/134 |
| 4,714,419 A | 12/1987 | Nielsen | |

(Continued)

FOREIGN PATENT DOCUMENTS

| | | |
|---|---|---|
| WO | 2005/041679 A2 | 10/2005 |
| WO | 2006/054896 A1 | 5/2006 |

OTHER PUBLICATIONS

International Search Report and Written Opinion dated Jul. 17, 2014 for Application No. PCT/EP2014/065451.

*Primary Examiner* — Robert B Davis
(74) *Attorney, Agent, or Firm* — The Dobrusin Law Firm, P.C.

(57) ABSTRACT

The present invention relates to a molding machine, particularly for lollipops, with a die set that, during production, rotates around an axle. The present invention further relates to a molding machine with a container for the stick and to a method to assemble or disassemble a die set from the axle of a molding machine.

18 Claims, 2 Drawing Sheets

(56) References Cited

U.S. PATENT DOCUMENTS

| | | |
|---|---|---|
| 7,344,742 B2 | 3/2008 | Wray |
| 8,020,690 B2 | 9/2011 | Asma |
| 8,397,476 B2 | 3/2013 | VanRens |
| 2007/0272089 A1 | 11/2007 | Asma |
| 2009/0019820 A1 | 1/2009 | Asma |

* cited by examiner

LOLLIPOP MOLDING MACHINE WITH A DIE SET

The present invention relates to a molding machine, particularly for lollipops, with a die set that, during production, rotates around an axle. The present invention further relates to a molding machine with a container for the stick and to a method to assemble or disassemble a die set from the axle of a molding machine.

Such molding machines are well known from the state of the art and are for example utilized to mold the head of a lollipop from a strand, for example made from a sugar mass. Such a die set comprises a number of molds, which are, for example, provided at the circumference of the die set. The die set and the molds are in most cases made from metal and consequently, the die set is rather heavy. For cleaning purposes and/or for a change in the production, this die set has to be removed from the molding machine, which was, in the past, a huge effort.

It was therefore the objective of the present invention to facilitate the removal of the die set from the machine.

This problem is attained by a molding machine, particularly for lollipops, with a die set that, during production, rotates around an axle, wherein the die set comprises a bearing, preferably a rolling body, for moving the die set axially along the axle during assembly and disassembly.

The disclosure made regarding this embodiment of the present invention also applies to the other embodiments and vice versa.

The present invention relates to a molding machine, particularly for molding the heads of a lollipop. The inventive machine comprises a die set, for example a drum, which rotates around an axle and which comprises at its circumference a multitude of molds, in which the sugar mass is cut from a strand and molded into the desired shape.

According to the present invention, the die set comprises a bearing, for example rolling bodies, e.g. spheres and/or cylinders, a linear guiding with rolling bodies or a floating bearing, particularly at its inner circumference for moving the die set axially along the axle during assembly and disassembly. The main function if the bearing is to reduce friction during assembly and disassembly. Due to this bearing, the die set needs not to be lifted for removal and/or the forces needed to move the die set axially along the axle are reduced significantly.

Preferably, the die set comprises a multitude of bearings, e.g. rolling bodies, particularly spheres.

In a preferred embodiment of the present invention, the bearing, for example each rolling body, is provided in or at a housing, which has even more preferred an essentially cylindrical shape. Preferably, the housing is in direct contact with the axle of the molding machine and does not rotate during production conditions of the inventive molding machine.

In a preferred embodiment, the axle comprises a ramp. This ramp lifts the housing and/or the rolling body while the housing is moved into its final position. As soon as the bearing, e.g. rolling bodies, are lifted away from the axle, significantly higher forces are needed to move the die set is axially. For a disassembly, the housing is moved again from the ramp, so that the bearing, e.g. the rolling bodies, get in touch with the axle again and the die set can be moved along the axle by means of the bearing, e.g. the rolling bodies.

Preferably, during production conditions, the rolling bodies are not in contact with the axle.

In yet another preferred embodiment, bearings, particularly ball bearings are provided between the housing and the die set, which bears the die set against the axle during production conditions.

Yet another preferred or inventive subject matter of the present invention is a molding machine which comprises a stick container, which provides sticks for a lollipop. During molding, this stick is inserted into the sugar mass.

For repair- and/or cleaning purposes, this container must be removed from the die set of the molding machine. For this purpose, the container is attached to a frame of the molding machine by two rotatable levers, which preferably are provided in parallel.

The disclosure made regarding this embodiment of the present invention also applies to the other embodiments and vice versa.

Yet another subject matter of the present invention is a method to assembly and disassembly a die set of a molding machine from its axle, wherein the die set is axially moved along the axle on rolling bodies.

The disclosure made regarding this embodiment of the present invention also applies to the other embodiments and vice versa.

The invention is now explained according to FIGS. 1 and 2. These explanations do not limit the scope of protection. The explanations apply to all embodiments likewise.

Figure 1:
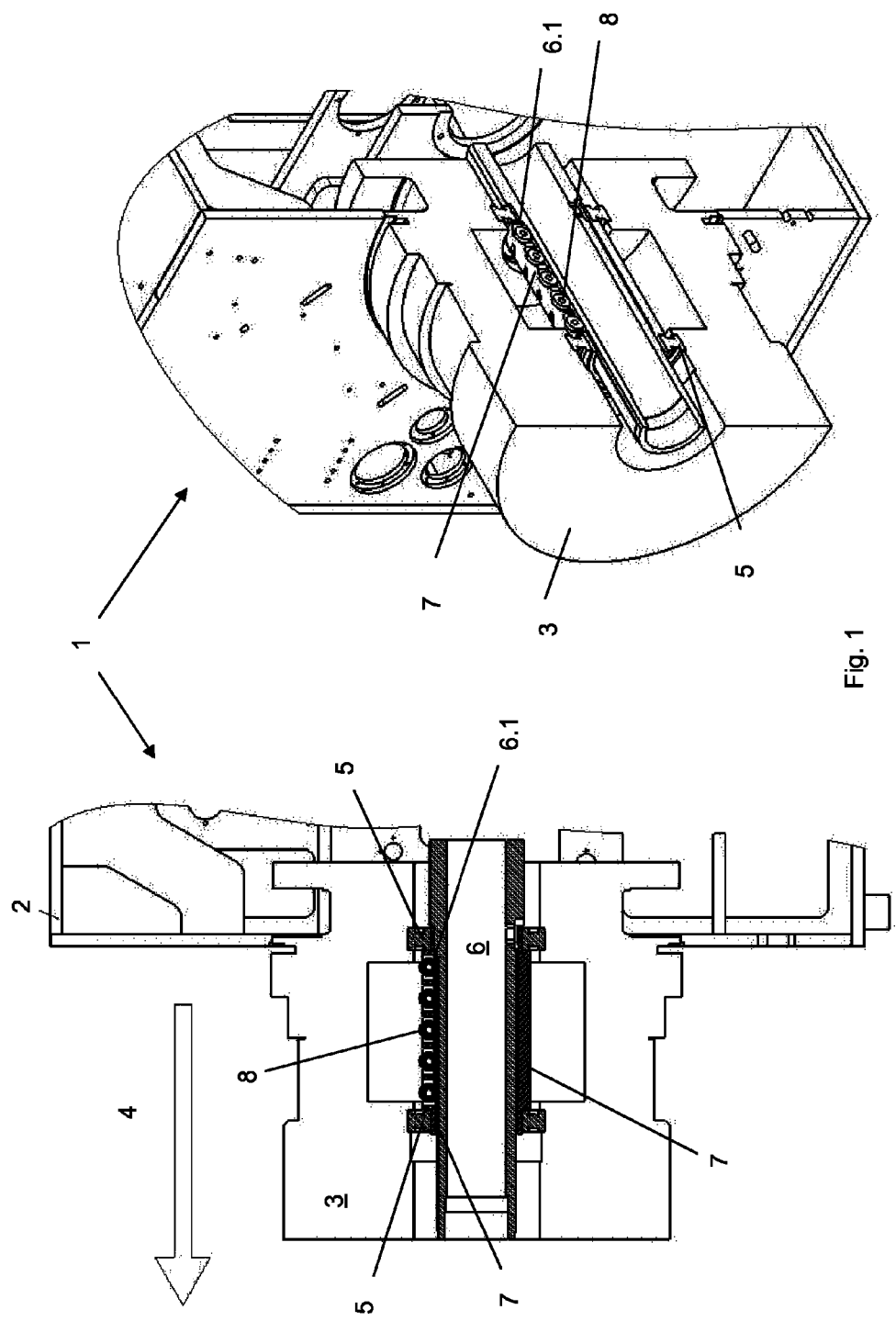
FIG. 1 shows a first embodiment of the inventive molding machine.

FIG. 1 shows a first embodiment of a lollipop molding machine 1, which comprises a frame 2 with an axle 6, which does not rotate. Preferably, this axle is hollow and is more preferably utilized to provide cooling to a die set 3, which, during production, rotates around the axle. A preferred cooling substance is air. For cleaning purposes, repair purposes and/or a change in production, the die set needs to be removed from the axle. This is carried out by moving the die set into the direction, which is depicted by arrow 4. For reassembly, the die set needs to be moved in the opposite direction onto the axle 6. Since the die sets in many cases have a relatively large diameter and are made from metal, the die sets are very heavy and in the past, it was a significant effort to remove the die set from the axle. Due to the present invention, this effort has been minimized significantly. This has been achieved by providing a bearing, here rolling bodies 8, particularly spheres, which are in direct contact with the axle 6 during assembly and disassembly of the die set. These rolling bodies 8 reduce the friction between the die set and the axle so that the assembly or disassembly of the die set can be carried out rather easily. The rolling bodies are no bearing during production but are only utilized during assembly/disassembly.

Preferably, the rolling bodies 8 are provided in or at a housing 7. Even more preferably, the diameter of the axle 6 is not constant but has a ramp 6.1. During the assembly of the die set at the axle 6, the housing 7 get into contact with the ramp 6.1 and is lifted by the ramp, closely before the die set reaches its final position relative to the axle 6. Consequently, the rolling bodies are lifted as well and are removed from the axle 6, so that the friction between the housing 7 and the axle is increased dramatically. For disassembly, the housing is again moved down the ramp, so that the rolling bodies 8 get in touch again with the axle, so that the die set can be rolled along the axle rather easily. For production purposes, the housing 7 is in direct contact with the axle 6, so that it does not move, particularly does not rotate relative to the axle 6. In order to facilitate the rotation of the die set, ball bearings 5 are provided between the housing 7 and the die set 3.

Figure 2:
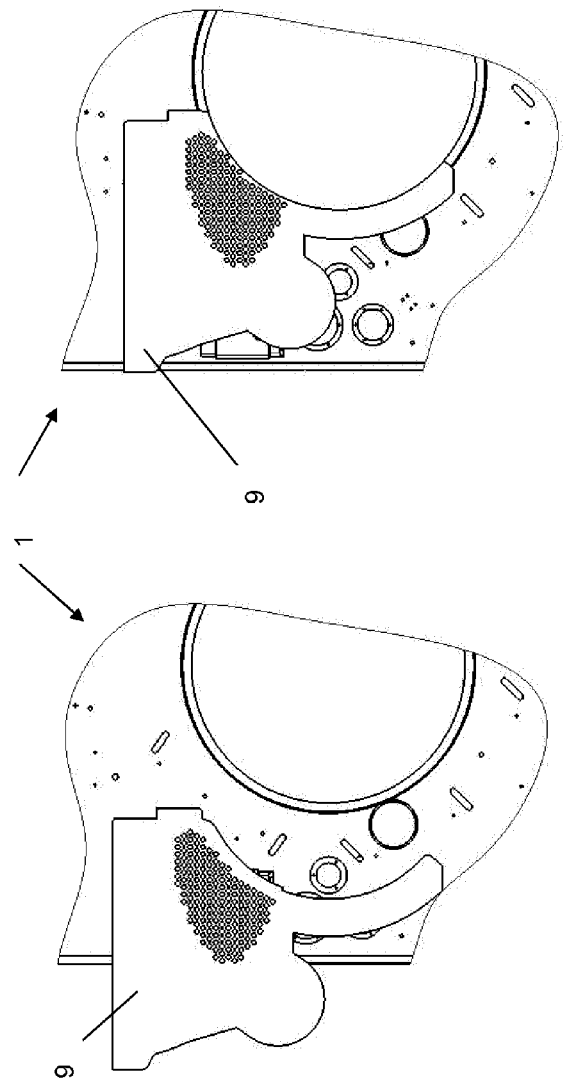
FIG. 2 shows a second embodiment of the inventive molding machine.
Figure 2:
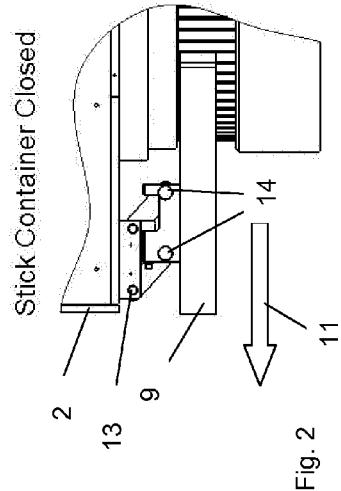
Figure 2:
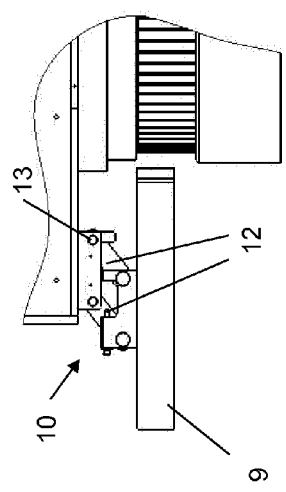

FIG. 2 shows another embodiment of the present invention. Again, a molding machine 1 is depicted with a rotating die set. In order to produce lollipops with a stick, the lollipop head is molded from for example a sugar strand and during or after the molding, a stick is inserted the sugar mass. These sticks are provided in a container 9, which has to be removed from the die set for example for repair- and/or cleaning purposes. On the left hand side of FIG. 2, the container 9 is depicted in its remote state from the die set. As can be particularly seen in the lower depictions of FIG. 2, the container 9 is attached to the frame 2 of the molding machine with a bearing 10, which comprises two levers 12, which are provided in parallel. Each lever has at its both ends a rotation axis 13, 14. In order to move the container 9 towards the die set, which is depicted in FIG. 2 on the right hand side, both levers are turned around axis 13. This embodiment of the present invention has the advantage, that only very little space is needed to move the container from its remote to its production position and vice versa.

LIST OF REFERENCE SIGNS

1 lollipop molding machine
2 frame
3 die set
3.1 inner diameter
4 direction to move die set out of machine
5 ball bearing
6 axle
6.1 ramp
7 housing
8 bearing, rolling body, sphere
9 stick container
10 bearing
11 movement of the container
12 lever
13 rotation axis
14 rotation axis

What is claimed is:

1. A molding machine for lollipops comprising: a die set that, during production, rotates around an axle,
   wherein the die set comprises a bearing, which is a rolling body, for moving the die set axially along the axle during assembly and disassembly.

2. The molding machine according to claim 1, wherein the rolling body is provided in and/or at a housing.

3. The molding machine according to claim 1, wherein the axle comprises a ramp.

4. The molding machine according to claim 3, wherein the rolling body and/or the housing is lifted during the assembly and lowered during the disassembly.

5. The molding machine according to claim 1, wherein the rolling body is not in contact with the axle during production.

6. The molding machine according to claim 2, wherein the molding machine comprises a bearing which bears the die set on the axle during production.

7. The molding machine according to claim 1, wherein the molding machine comprises a stick container which provides sticks for a lollipop.

8. The molding machine according to claim 7, wherein the container is attached to a frame of the molding machine by two rotating levers which are provided in parallel.

9. A method to assemble and disassemble a die set of a molding machine from an axle of the molding machine, wherein the die set is axially moved along the axle on rolling bodies.

10. The molding machine according to claim 2, wherein the axle comprises a ramp.

11. The molding machine according to claim 2, wherein the rolling body is not in contact with the axle during production.

12. The molding machine according to claim 3, wherein the rolling body is not in contact with the axle during production.

13. The molding machine according to claim 3, wherein the molding machine comprises a bearing which bears the die set on the axle during production.

14. The molding machine according to claim 4, wherein the molding machine comprises a bearing which bears the die set on the axle during production.

15. The molding machine according to claim 5, wherein the molding machine comprises a bearing which bears the die set on the axle during production.

16. The molding machine according to claim 2, wherein the molding machine comprises a stick container which provides sticks for a lollipop.

17. The molding machine according to claim 3, wherein the molding machine comprises a stick container which provides sticks for a lollipop.

18. The molding machine according to claim 15, wherein the molding machine comprises a stick container which provides sticks for a lollipop.

* * * * *